US012726839B2

(12) United States Patent
Zhu

(10) Patent No.: US 12,726,839 B2
(45) Date of Patent: Sep. 1, 2026

(54) INTERFERENCE MEASUREMENT METHOD, INTERFERENCE PROCESSING METHOD, AND APPARATUSES THEREFOR

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 360 days.

(21) Appl. No.: 18/564,473

(22) PCT Filed: May 28, 2021

(86) PCT No.: PCT/CN2021/096975
§ 371 (c)(1),
(2) Date: Nov. 27, 2023

(87) PCT Pub. No.: WO2022/246847
PCT Pub. Date: Dec. 1, 2022

(65) Prior Publication Data
US 2024/0259845 A1 Aug. 1, 2024

(51) Int. Cl.
*H04W 24/08* (2009.01)
*H04B 17/345* (2015.01)
(Continued)

(52) U.S. Cl.
CPC .......... *H04W 24/08* (2013.01); *H04B 17/345* (2015.01); *H04L 5/0051* (2013.01); *H04W 24/10* (2013.01)

(58) Field of Classification Search
CPC .... H04W 24/08; H04W 24/10; H04B 17/345; H04L 5/0051
See application file for complete search history.

(56) References Cited

U.S. PATENT DOCUMENTS 11,153,774 B2 * 10/2021 Wu .................... H04W 24/10
11,190,323 B2 * 11/2021 Chen .................. H04W 72/23
(Continued)

FOREIGN PATENT DOCUMENTS

CN 106412947 A 2/2017
CN 108289311 A 7/2018
WO WO 2020200171 A1 10/2020

OTHER PUBLICATIONS

European Patent Application No. 21942418.1, partial Search and Opinion dated Feb. 27, 2025, 15 pages.
(Continued)

*Primary Examiner* — Chandrahas B Patel
(74) *Attorney, Agent, or Firm* — Cozen O'Connor

(57) ABSTRACT

An interference measurement method is performed by a first terminal device and includes: receiving an inter user equipment interference management reference signal (UE-IM-RS); and determining a second terminal device that sends the UE-IM-RS and determining an interference measurement result of the second terminal device according to the UE-IM-RS, in which determining the interference measurement result of the second terminal device includes: determining measurement data of the UE-IM-RS; determining that the measurement data is greater than or equal to a measurement threshold value, and the interference measurement result indicates that the second terminal device is an interference terminal device to be reported by the first terminal device; determining that the measurement data is less than the measurement threshold value, and the interference measurement result indicates that the second terminal device is not an interference terminal device to be reported by the first terminal device.

19 Claims, 7 Drawing Sheets

(51) Int. Cl.
*H04L 5/00* (2006.01)
*H04W 24/10* (2009.01)

(56) References Cited

U.S. PATENT DOCUMENTS

| | | | | |
|---|---|---|---|---|
| 2017/0048741 | A1 | 2/2017 | Lee et al. | |
| 2017/0071004 | A1 | 3/2017 | Noh et al. | |
| 2017/0257177 | A1 | 9/2017 | Noh et al. | |
| 2021/0153043 | A1* | 5/2021 | Gao | H04L 5/0048 |
| 2022/0022073 | A1* | 1/2022 | Zhang | H04W 24/08 |

OTHER PUBLICATIONS

PCT/CN2021/096975 International Search Report dated Mar. 8, 2022, 2 pages.

* cited by examiner

INTERFERENCE MEASUREMENT METHOD, INTERFERENCE PROCESSING METHOD, AND APPARATUSES THEREFOR

CROSS-REFERENCE TO RELATED APPLICATIONS

This application is a U.S. National Phase application of International Application No. PCT/CN2021/096975, filed May 28, 2021, the entire contents of which are incorporated herein by reference.

TECHNICAL FIELD

The present disclosure relates to the field of communication technology, and more particularly to an interference measurement method and apparatus, and an interference processing method and apparatus.

BACKGROUND

In the related art, with the developments of a radio frequency technology and a digital domain interference cancellation technology, a network device may use a co-frequency co-time full duplex technology in some scenarios. However, a terminal device may need to use a time division duplex (TDD) or frequency division duplex (FDD) technology due to limits imposed by factors such as a size of a terminal device and cost of implementation.

In this case, since the network device may use a same time and frequency for both transmission and reception, mutual interferences may arise among a plurality of terminal devices in a same cell or adjacent cells. However, currently, there are no effective interference measurement methods, and it is likely that the network device uses the co-frequency co-time full duplex technology to send and receive data causing serious interference between the plurality of terminal devices, resulting in a poor data transmission efficiency and low accuracy.

SUMMARY

Embodiments of a first aspect of the present disclosure provide an interference measurement method, which is performed by a first terminal device and includes: receiving an inter user equipment interference management reference signal (UE-IM-RS); and determining a second terminal device that sends the UE-IM-RS and determining an interference measurement result of the second terminal device according to the UE-IM-RS.

Embodiments of a second aspect of the present disclosure provide an interference measurement method, which is performed by a second terminal device and includes: generating an inter user equipment interference management reference signal (UE-IM-RS) according to an identifier of the second terminal device; and sending the UE-IM-RS.

Embodiments of a third aspect of the present disclosure provide an interference processing method, which is performed by a network device and includes: receiving a terminal device identifier of a second terminal device and measurement data from a first terminal device; and determining a scheduling strategy of the first terminal device and the second terminal device according to the measurement data. The second terminal device belongs to an interference terminal device to be reported by the first terminal device; and the measurement data are measurement data of an inter user equipment interference management reference signal (UE-IM-RS) sent by the second terminal device to the first terminal device.

Embodiments of a fourth aspect of the present disclosure provide an interference measurement device, which includes: a processor; and a memory having stored therein a computer program. The processor executes the computer program stored in the memory, to cause the device to implement the method described in the above embodiments of the first aspect or the method described in the above embodiments of the second aspect.

Embodiments of a fifth aspect of the present disclosure provide an interference processing device, which includes: a processor; and a memory having stored therein a computer program. The processor executes the computer program stored in the memory, to cause the device to implement the method described in the above embodiments of the third aspect.

Embodiments of a seventh aspect of the present disclosure provide a computer-readable storage medium having stored therein instructions that, when executed, cause the method described in the above embodiments of the first aspect or the method described in the above embodiments of the second aspect to be implemented.

Embodiments of an eighth aspect of the present disclosure provide another computer-readable storage medium having stored therein instructions that, when executed, cause the method described in the above embodiments of the third aspect to be implemented.

Additional aspects and advantages of embodiments of the present disclosure will be given in part in the following descriptions, become apparent in part from the following descriptions, or be learned from the practice of embodiments of the present disclosure.

BRIEF DESCRIPTION OF THE DRAWINGS

The drawings of the present disclosure will be described briefly below.

DETAILED DESCRIPTION

Figure 1:
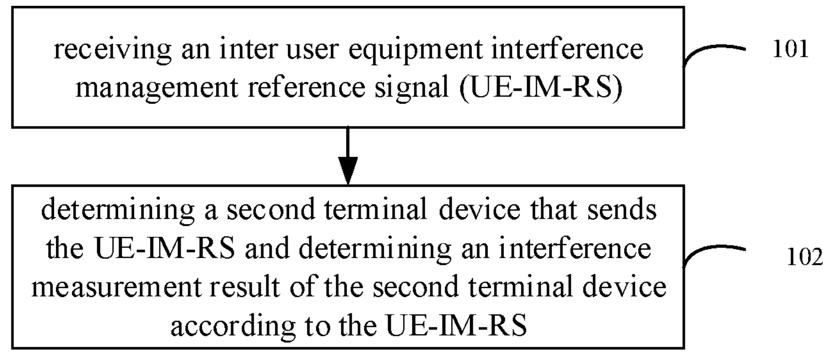
FIG. 1 is a flowchart of an interference measurement method performed by a first terminal device provided by embodiments of the present disclosure.

Reference will now be made in detail to illustrative embodiments, examples of which are illustrated in the accompanying drawings. The following description refers to the accompanying drawings in which the same numbers in different drawings represent the same or similar elements unless otherwise represented. The implementations set forth in the following description of illustrative embodiments do not represent all implementations consistent with embodiments of the present disclosure. Instead, they are merely examples of devices and methods consistent with some aspects of embodiments of the present disclosure as recited in the appended claims.

Terms used herein in embodiments of the present disclosure are only for the purpose of describing specific embodiments, but should not be construed to limit embodiments of the present disclosure. As used in embodiments of the present disclosure and the appended claims, "a/an" and "the" in singular forms are intended to include plural forms, unless clearly indicated in the context otherwise. It should also be understood that, the term "and/or" used herein represents and contains any or all possible combinations of one or more associated listed items.

It should be understood that, although terms such as "first," "second" and "third" may be used in embodiments of the present disclosure for describing various information, these information should not be limited by these terms. These terms are only used for distinguishing information of the same type from each other. For example, first information may also be referred to as second information, and similarly, the second information may also be referred to as the first information, without departing from the scope of embodiments of the present disclosure. As used herein, the term "if" may be construed to mean "when" or "upon" or "in response to determining" depending on the context.

Embodiments of the present disclosure will be described in detail below, and examples of embodiments are illustrated in the drawings. The same or similar elements are denoted by like reference numerals throughout the descriptions. Embodiments described herein with reference to drawings are explanatory, serve to explain the present disclosure, and cannot be construed to limit embodiments of the present disclosure.

Embodiments of a first aspect of the present disclosure provide an interference measurement method, which is performed by a first terminal device and includes: receiving an inter user equipment interference management reference signal (UE-IM-RS); and determining a second terminal device that sends the UE-IM-RS and determining an interference measurement result of the second terminal device according to the UE-IM-RS.

In this method, based on the received inter user equipment interference management reference signal (UE-IM-RS), the second terminal device that sends the UE-IM-RS may be determined, and the interference measurement result of the second terminal device may be determined, so that the first terminal device is able to determine a second terminal device that has a strong mutual interference with it, thereby facilitating a network device to perform scheduling, avoiding concurrence of a data reception of the first terminal device and a data transmission of the second terminal device on a same-frequency, and improving the efficiency and accuracy of data transmission.

In some embodiments, a time-frequency resource for receiving the UE-IM-RS is a time-frequency resource configured by a network device, or a time-frequency resource in a time-frequency resource pool configured by the network device.

In some embodiments, determining the second terminal device that sends the UE-IM-RS includes: parsing the UE-IM-RS to obtain a terminal device identifier; and determining a terminal device corresponding to the terminal device identifier as the second terminal device that sends the UE-IM-RS.

In some embodiments, determining the interference measurement result of the second terminal device includes: determining measurement data of the UE-IM-RS; in response to the measurement data being greater than or equal to a measurement threshold value corresponding to the measurement data, determining that the interference measurement result is that the second terminal device belongs to an interference terminal device to be reported by the first terminal device; and in response to the measurement data being less than the measurement threshold value corresponding to the measurement data, determining that the interference measurement result is that the second terminal device does not belong to the interference terminal device to be reported by the first terminal device.

In some embodiments, the method further includes: in response to the interference measurement result being that the second terminal device belongs to the interference terminal device to be reported by the first terminal device, sending a terminal device identifier of the second terminal device and the measurement data to a network device.

In some embodiments, the measurement data includes at least one of: a reference signal receiving power (RSRP), a reference signal receiving quality (RSRQ), or a signal to interference plus noise ratio (SINR).

In some embodiments, the measurement threshold value corresponding to the measurement data is configured by a network device or determined according to a protocol.

In some embodiments, among time-frequency resources for the first terminal device to receive signals and time-frequency resources for the second terminal device to send signals, resources with a same time and a same frequency exist.

Embodiments of a second aspect of the present disclosure provide an interference measurement method, which is performed by a second terminal device and includes: generating an inter user equipment interference management reference signal (UE-IM-RS) according to an identifier of the second terminal device; and sending the UE-IM-RS.

In some embodiments, a time-frequency resource for sending the UE-IM-RS is a time-frequency resource configured by a network device, or a time-frequency resource selected from a time-frequency resource pool configured by the network device.

In some embodiments, among time-frequency resources for a first terminal device that receives the UE-IM-RS to receive signals and time-frequency resources for the second terminal device to send signals, resources with a same time and a same frequency exist.

Embodiments of a third aspect of the present disclosure provide an interference processing method, which is performed by a network device and includes: receiving a terminal device identifier of a second terminal device and measurement data from a first terminal device; and determining a scheduling strategy of the first terminal device and the second terminal device according to the measurement data. The second terminal device belongs to an interference terminal device to be reported by the first terminal device; and the measurement data are measurement data of an inter user equipment interference management reference signal (UE-IM-RS) sent by the second terminal device to the first terminal device.

In some embodiments, determining the scheduling strategy of the first terminal device and the second terminal device according to the measurement data includes: performing grouping processing on the first terminal device and the second terminal device according to the measurement data and a specified grouping strategy to obtain a grouping result; and determining the scheduling strategy of the first terminal device and the second terminal device according to the grouping result.

In some embodiments, the grouping strategy is that when the measurement data are greater than or equal to a first grouping measurement threshold value corresponding to the measurement data, the first terminal device and the second terminal device are classified into a group. The scheduling strategy is that a co-frequency co-time full duplex pairing is not supported between the first terminal device and the second terminal device in the group.

In some embodiments, the grouping strategy is that when the measurement data are less than a second grouping measurement threshold value corresponding to the measurement data, the first terminal device and the second terminal device are classified into a group. The scheduling strategy is that a co-frequency co-time full duplex pairing is supported between the first terminal device and the second terminal device in the group.

In some embodiments, the method further includes: configuring a time-frequency resource for communicating the UE-IM-RS; or configuring a time-frequency resource pool for selecting a time-frequency resource for communicating the UE-IM-RS.

Embodiments of the present disclosure provide an interference measurement apparatus, which is applied to a first terminal device and includes: a transceiving unit configured to receive an inter user equipment interference management reference signal (UE-IM-RS); and a processing unit configured to determine a second terminal device that sends the UE-IM-RS and determine an interference measurement result of the second terminal device according to the UE-IM-RS.

In some embodiments, a time-frequency resource for receiving the UE-IM-RS is a time-frequency resource configured by a network device, or a time-frequency resource in a time-frequency resource pool configured by the network device.

In some embodiments, the processing unit is specifically configured to: parse the UE-IM-RS to obtain a terminal device identifier; and determine a terminal device corresponding to the terminal device identifier as the second terminal device that sends the UE-IM-RS.

In some embodiments, the processing unit is specifically configured to: determine measurement data of the UE-IM-RS; in response to the measurement data being greater than or equal to a measurement threshold value corresponding to the measurement data, determine that the interference measurement result is that the second terminal device belongs to an interference terminal device to be reported by the first terminal device; and in response to the measurement data being less than the measurement threshold value corresponding to the measurement data, determine that the interference measurement result is that the second terminal device does not belong to the interference terminal device to be reported by the first terminal device.

In some embodiments, the transceiving unit is further configured to send a terminal device identifier of the second terminal device and the measurement data to a network device in response to the interference measurement result being that the second terminal device belongs to the interference terminal device to be reported by the first terminal device.

In some embodiments, the measurement data includes at least one of: a reference signal receiving power (RSRP), a reference signal receiving quality (RSRQ), or a signal to interference plus noise ratio (SINR).

In some embodiments, the measurement threshold value corresponding to the measurement data is configured by a network device or determined according to a protocol.

In some embodiments, among time-frequency resources for the first terminal device to receive signals and time-frequency resources for the second terminal device to send signals, resources with a same time and a same frequency exist.

Embodiments of the present disclosure provide an interference measurement apparatus, which is applied to a second terminal device and includes: a processing unit configured to generate an inter user equipment interference management reference signal (UE-IM-RS) according to an identifier of the second terminal device; and a transceiving unit configured to send the UE-IM-RS.

In some embodiments, a time-frequency resource for sending the UE-IM-RS is a time-frequency resource configured by a network device, or a time-frequency resource selected from a time-frequency resource pool configured by the network device.

In some embodiments, among time-frequency resources for a first terminal device that receives the UE-IM-RS to receive signals and time-frequency resources for the second terminal device to send signals, resources with a same time and a same frequency exist.

Embodiments of the present disclosure provide an interference processing apparatus, which is applied to a network device and includes: a transceiving unit configured to receive a terminal device identifier of a second terminal device and measurement data from a first terminal device; and a processing unit configured to determine a scheduling strategy of the first terminal device and the second terminal device according to the measurement data. The second terminal device belongs to an interference terminal device to be reported by the first terminal device; and the measurement data are measurement data of an inter user equipment interference management reference signal (UE-IM-RS) sent by the second terminal device to the first terminal device.

In some embodiments, the processing unit is specifically configured to: perform grouping processing on the first terminal device and the second terminal device according to the measurement data and a specified grouping strategy to obtain a grouping result; and determine the scheduling strategy of the first terminal device and the second terminal device according to the grouping result.

In some embodiments, the grouping strategy is that when the measurement data are greater than or equal to a first grouping measurement threshold value corresponding to the measurement data, the first terminal device and the second terminal device are classified into a group. The scheduling strategy is that a co-frequency co-time full duplex pairing is not supported between the first terminal device and the second terminal device in the group.

In some embodiments, the grouping strategy is that when the measurement data are less than a second grouping measurement threshold value corresponding to the measurement data, the first terminal device and the second terminal device are classified into a group. The scheduling strategy is that a co-frequency co-time full duplex pairing is supported between the first terminal device and the second terminal device in the group.

Embodiments of the present disclosure provide an interference measurement device, which includes: a processor; and a memory having stored therein a computer program. The processor executes the computer program stored in the memory, to cause the device to implement the method described in the above embodiments of the first aspect or the method described in the above embodiments of the second aspect.

Embodiments of the present disclosure provide an interference processing device, which includes: a processor; and a memory having stored therein a computer program. The processor executes the computer program stored in the memory, to cause the device to implement the method described in the above embodiments of the third aspect.

Embodiments of the present disclosure provide an interference measurement device, which includes: a processor and an interface circuit. The interface circuit is configured to receive code instructions and transmit the code instructions to the processor. The processor is configured to run the code instructions to implement the method described in the above embodiments of the first aspect or the method described in the above embodiments of the second aspect.

Embodiments of the present disclosure provide an interference processing device, which includes: a processor and an interface circuit. The interface circuit is configured to receive code instructions and transmit the code instructions to the processor. The processor is configured to run the code instructions to implement the method described in the above embodiments of the third aspect.

Embodiments of the present disclosure provide a computer-readable storage medium having stored therein instructions that, when executed, cause the method described in the above embodiments of the first aspect or the method described in the above embodiments of the second aspect to be implemented.

Embodiments of the present disclosure provide another computer-readable storage medium having stored therein instructions that, when executed, cause the method described in the above embodiments of the third aspect to be implemented.

Embodiments of the present disclosure provide a computer program product that, when run on a computer, causes the computer to implement the method described in the above embodiments of the first aspect or the method described in the above embodiments of the second aspect.

Embodiments of the present disclosure provide another computer program product that, when run on a computer, causes the computer to implement the method described in the above embodiments of the third aspect.

Additional aspects and advantages of embodiments of the present disclosure will be given in part in the following descriptions, become apparent in part from the following descriptions, or be learned from the practice of embodiments of the present disclosure.

FIG. 1 is an interference measurement method provided by embodiments of the present disclosure. It should be noted that the interference measurement method in embodiments of the present disclosure is performed by a first terminal device.

As shown in FIG. 1, the interference measurement method may include the following steps.

In step 101, an inter user equipment interference management reference signal (UE-IM-RS) is received.

In embodiments of the present disclosure, a second terminal device may send a generated inter user equipment interference management reference signal (UE-IM-RS) to the first terminal device. The first terminal device may receive the UE-IM-RS. The second terminal device may be user equipment A (UE-A), and the first terminal device may be user equipment B (UE-B).

In step 102, a second terminal device that sends the UE-IM-RS and an interference measurement result of the second terminal device are determined according to the UE-IM-RS.

In some embodiments, after receiving the UE-IM-RS, the first terminal device may parse the UE-IM-RS, determine the second terminal device that sends the UE-IM-RS according to a parsing result, and determine measurement data of the UE-IM-RS according to the UE-IM-RS. According to the measurement data, it may be determined whether the second terminal device that sends the UE-IM-RS causes an interference to the first terminal device. When the second terminal device may cause the interference to the first terminal device, the second terminal device belongs to an interference terminal device to be reported by the first terminal device. When the second terminal device does not cause the interference to the first terminal device, the second terminal device does not belong to the interference terminal device to be reported by the first terminal device.

In summary, based on the received inter user equipment interference management reference signal (UE-IM-RS), the second terminal device that sends the UE-IM-RS may be determined and the interference measurement result of the second terminal device may be determined, so that the first terminal device is able to determine a second terminal device that has a mutual interference with it, thereby facilitating a network device to perform scheduling, avoiding concurrence of a data reception of the first terminal device and a data transmission of the second terminal device on a same-frequency, and improving the efficiency and accuracy of data transmission.

Figure 2:
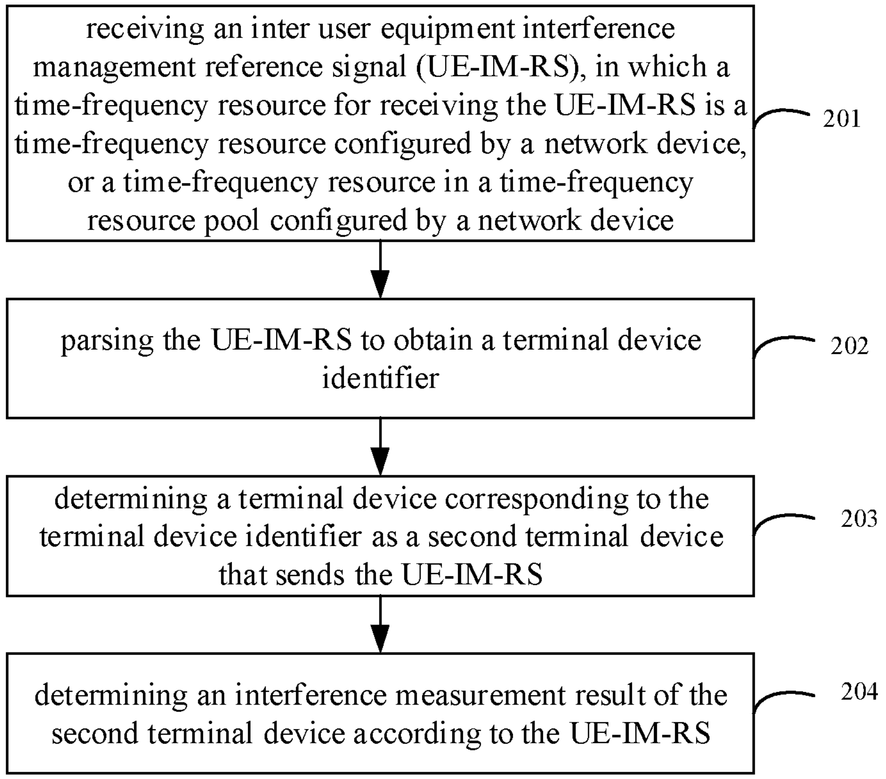
FIG. 2 is a schematic flowchart of an interference measurement method provided by embodiments of the present disclosure.

Embodiments of the present disclosure provide an interference measurement method. FIG. 2 is a schematic flowchart of an interference measurement method provided by embodiments of the present disclosure. The interference measurement method may be performed by a first terminal device. The interference measurement method may be performed separately, or performed in conjunction with any embodiment of the present disclosure, or performed in conjunction with a possible implementation of embodiments, or performed in conjunction with any technical solution in the related art.

As shown in FIG. 2, the interference measurement method may include the following steps.

In step 201, an inter user equipment interference management reference signal (UE-IM-RS) is received. A time-frequency resource for receiving the UE-IM-RS is a time-frequency resource configured by a network device, or a time-frequency resource in a time-frequency resource pool configured by the network device.

In embodiments of the present disclosure, the first terminal device may receive the UE-IM-RS sent by a second terminal device. It should be noted that the time-frequency resource for receiving the UE-IM-RS may be a time-frequency resource configured by the network device (such as a base station) via a signaling, or the time-frequency resource for receiving the UE-IM-RS is a time-frequency resource in a time-frequency resource pool configured by the network device via a signaling. In addition, among time-frequency resources for the first terminal device to receive signals and time-frequency resources for the second terminal device to send signals, resources with a same time and a same frequency exist.

In step 202, the UE-IM-RS is parsed to obtain a terminal device identifier.

Further, after receiving the UE-IM-RS, the first terminal device may parse the UE-IM-RS, and obtain a terminal device identifier of a terminal device that sends the UE-IM-RS according to a parsing result.

In step 203, a terminal device corresponding to the terminal device identifier is determined as a second terminal device that sends the UE-IM-RS.

Furthermore, after obtaining the terminal device identifier, the terminal device corresponding to the terminal device identifier may be obtained, and the terminal device is determined as the second terminal device that sends the UE-IM-RS.

In step 204, an interference measurement result of the second terminal device is determined according to the UE-IM-RS.

In embodiments of the present disclosure, the step 204 may be implemented in any manner as described in various embodiments of the present disclosure, which is not limited by embodiments of the present disclosure and will not be described again.

In summary, the inter user equipment interference management reference signal (UE-IM-RS) is received; the UE-IM-RS is parsed to obtain the terminal device identifier; the terminal device corresponding to the terminal device identifier is determined as the second terminal device that sends the UE-IM-RS; and the interference measurement result of the second terminal device is determined according to the UE-IM-RS. The time-frequency resource for receiving the UE-IM-RS is the time-frequency resource configured by the network device, or the time-frequency resource in the time-frequency resource pool configured by the network device. The method may determine the second terminal device that sends the UE-IM-RS by parsing the UE-IM-RS, and determine the interference measurement result of the second terminal device according to the UE-IM-RS, so that the first terminal device is able to determine a second terminal device that has a mutual interference with it, thereby facilitating the network device to perform scheduling, avoiding concurrence of a data reception of the first terminal device and a data transmission of the second terminal device on a same-frequency, and improving the efficiency and accuracy of data transmission.

Figure 3:
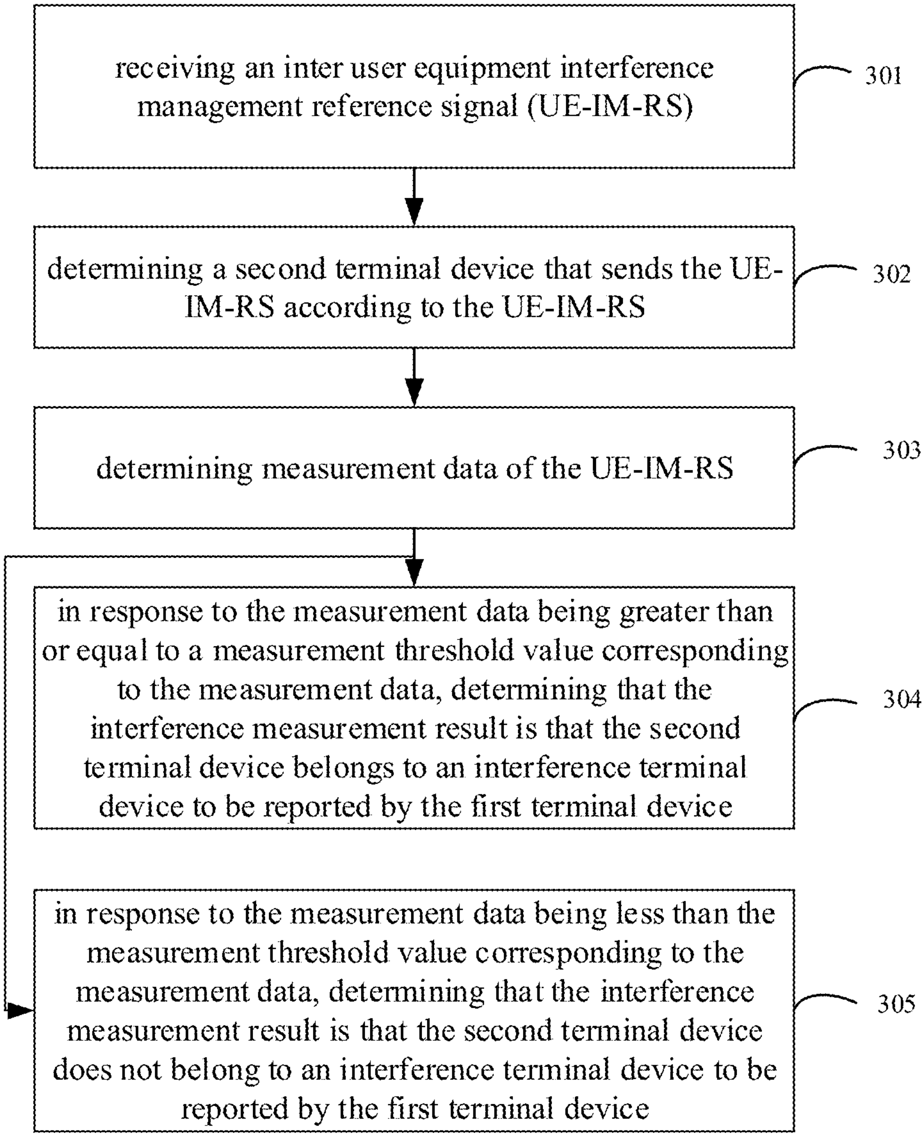
FIG. 3 is a schematic flowchart of an interference measurement method provided by embodiments of the present disclosure.

Embodiments of the present disclosure provide an interference measurement method. FIG. 3 is a schematic flowchart of an interference measurement method provided by embodiments of the present disclosure. The interference measurement method may be performed by a first terminal device. The interference measurement method may be performed separately, or performed in conjunction with any embodiment of the present disclosure, or performed in conjunction with a possible implementation of embodiments, or performed in conjunction with any technical solution in the related art.

As shown in FIG. 3, the interference measurement method may include the following steps.

In step 301, an inter user equipment interference management reference signal (UE-IM-RS) is received.

In step 302, a second terminal device that sends the UE-IM-RS is determined according to the UE-IM-RS.

In step 303, measurement data of the UE-IM-RS are determined.

In embodiments of the present disclosure, an interference measurement may be performed according to the UE-IM-RS to determine the measurement data of the UE-IM-RS. It should be noted that the measurement data are obtained from the measurement performed by the first terminal device during a process of receiving the above UE-IM-RS, and includes at least one of: a reference signal receiving power (RSRP), a reference signal receiving quality (RSRQ), or a signal to interference plus noise ratio (SINR). The RSRP is a receiving power when the first terminal device receives the UE-IM-RS, which may reflect a receiving strength of the UE-IM-RS. The RSRQ is a ratio of N times the RSRP to a received signal strength indication (RSSI), that is, RSRQ=N*RSRP/RSSI, where the N represents a number of resource blocks (RBs) contained in a measurement bandwidth of the RSSI, and the RSRQ may reflect a relative size between the UE-IM-RS and an interference. The SINR may be a ratio of a strength of the received UE-IM-RS to a strength of a received interference signal (a noise and the interference) by the first terminal device.

In step 304, in response to the measurement data being greater than or equal to a measurement threshold value corresponding to the measurement data, it is determined that the interference measurement result is that the second terminal device belongs to an interference terminal device to be reported by the first terminal device.

In embodiments of the present disclosure, the measurement data may include one or more of the RSRP, the RSRQ, and the SINR, and different data in the measurement data correspond to different measurement threshold values. It should be noted that the measurement threshold value corresponding to the measurement data is configured by a network device or determined according to a protocol.

As an example, when the measurement data include one of the RSRP, the RSRQ, and the SINR, and when the measurement data are greater than or equal to the measurement threshold value corresponding to the measurement data, it may be determined that the interference measurement result is that the second terminal device belongs to the interference terminal device to be reported by the first terminal device.

As another example, when the measurement data includes two or more of the RSRP, the RSRQ, and the SINR, measurement threshold values corresponding to different data in the measurement data may be obtained respectively, and when any kind of data in the measurement data is greater than the corresponding measurement threshold value, it may be determined that the interference measurement result is that the second terminal device belongs to the interference terminal device to be reported by the first terminal device.

In step 305, in response to the measurement data being less than the measurement threshold value corresponding to the measurement data, it is determined that the interference measurement result is that the second terminal device does not belong to the interference terminal device to be reported by the first terminal device.

As an example, when the measurement data include one of the RSRP, the RSRQ, and the SINR, and when the measurement data are less than the measurement threshold value corresponding to the measurement data, it may be determined that the interference measurement result is that the second terminal device does not belong to the interference terminal device to be reported by the first terminal device.

As another example, when the measurement data includes two or more of the RSRP, the RSRQ, and the SINR, and when all data in the measurement data are less than the respective measurement threshold values, it may be determined that the interference measurement result is that the second terminal device does not belong to the interference terminal device to be reported by the first terminal device.

In embodiments of the present disclosure, the steps 301 and 302 may be implemented in any manner as described in various embodiments of the present disclosure, which is not limited by embodiments of the present disclosure and will not be described again.

In summary, the inter user equipment interference management reference signal (UE-IM-RS) is received; the second terminal device that sends the UE-IM-RS is determined according to the UE-IM-RS; the measurement data of the UE-IM-RS is determined; in response to the measurement data being greater than or equal to the measurement threshold value corresponding to the measurement data, it is determined that the interference measurement result is that the second terminal device belongs to the interference terminal device to be reported by the first terminal device; and in response to the measurement data being less than the measurement threshold value corresponding to the measurement data, it is determined that the interference measurement result is that the second terminal device does not belong to the interference terminal device to be reported by the first terminal device. The method determines the second terminal device that sends the UE-IM-RS according to the UE-IM-RS, and determines whether the second terminal device belongs to the interference terminal device to be reported by the first terminal device according to the measurement data of the UE-IM-RS. As a result, the first terminal device is able to determine a second terminal device that has a mutual interference with it, thereby facilitating the network device to perform scheduling, avoiding concurrence of a data reception of the first terminal device and a data transmission of the second terminal device on a same-frequency, and improving the efficiency and accuracy of data transmission.

Figure 4:
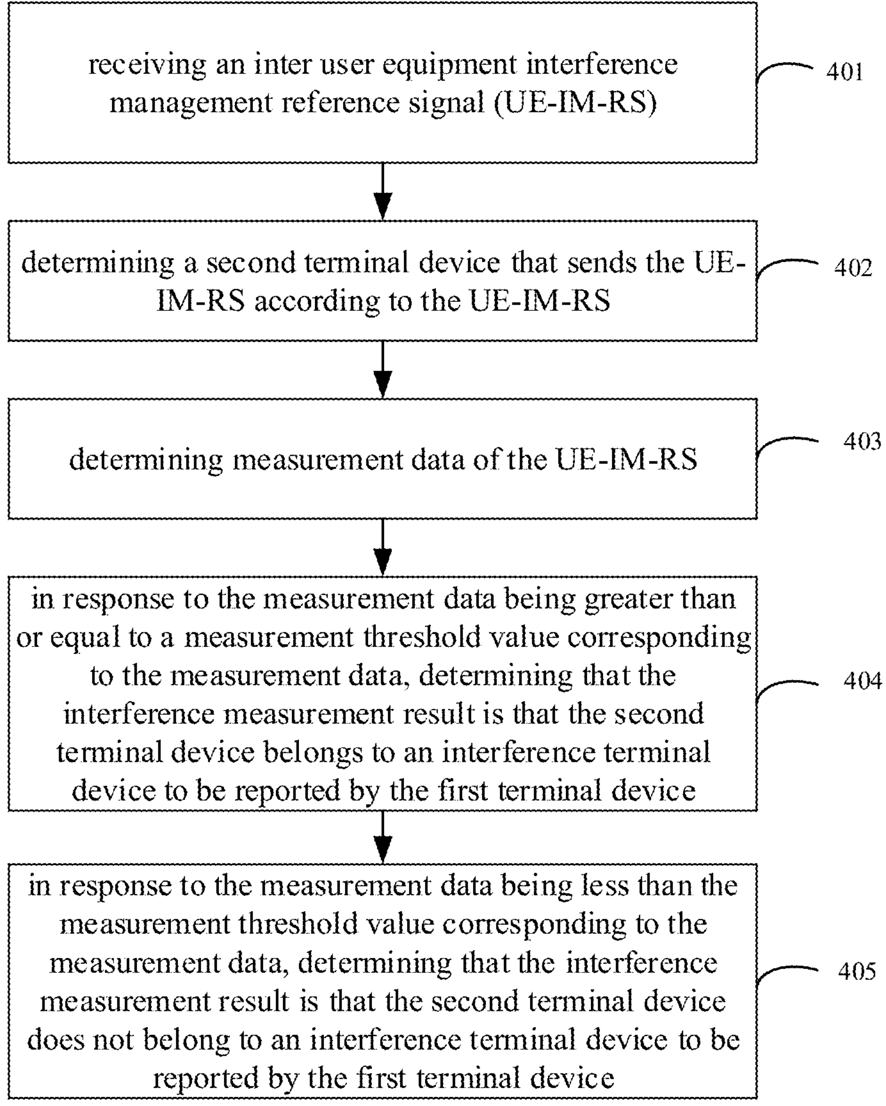
FIG. 4 is a schematic flowchart of an interference measurement method provided by embodiments of the present disclosure.

Embodiments of the present disclosure provide an interference measurement method. FIG. 4 is a schematic flowchart of an interference measurement method provided by embodiments of the present disclosure. The interference measurement method may be performed by a first terminal device. The interference measurement method may be performed separately, or performed in conjunction with any embodiment of the present disclosure, or performed in conjunction with a possible implementation of embodiments, or performed in conjunction with any technical solution in the related art.

As shown in FIG. 4, the interference measurement method may include the following steps.

In step 401, an inter user equipment interference management reference signal (UE-IM-RS) is received.

In step 402, a second terminal device that sends the UE-IM-RS is determined according to the UE-IM-RS.

In step 403, measurement data of the UE-IM-RS are determined.

In step 404, in response to the measurement data being greater than or equal to a measurement threshold value corresponding to the measurement data, it is determined that the interference measurement result is that the second terminal device belongs to an interference terminal device to be reported by the first terminal device.

In step 405, in response to the interference measurement result being that the second terminal device belongs to the interference terminal device to be reported by the first terminal device, a terminal device identifier of the second terminal device and the measurement data are sent to a network device.

In embodiments of the present disclosure, when the measurement data are greater than or equal to the measurement threshold value corresponding to the measurement data and it is determined that the interference measurement result is that the second terminal device belongs to the interference terminal device to be reported by the first terminal device, the terminal device identifier of the second terminal device may be sent to the network device, and data in the measurement data that are greater than or equal to the measurement threshold value corresponding to the measurement data are sent to the network device. In addition, if the measurement data are less than the measurement threshold value corresponding to the measurement data, it is determined that the interference measurement result is that the second terminal device does not belong to the interference terminal device to be reported by the first terminal device.

In embodiments of the present disclosure, the steps 401 to 404 may be implemented in any manner as described in various embodiments of the present disclosure, which is not limited by embodiments of the present disclosure and will not be described again.

In summary, the inter user equipment interference management reference signal (UE-IM-RS) is received; the second terminal device that sends the UE-IM-RS is determined according to the UE-IM-RS; the measurement data of the UE-IM-RS is determined; in response to the measurement data being greater than or equal to the measurement threshold value corresponding to the measurement data, it is determined that the interference measurement result is that the second terminal device belongs to the interference terminal device to be reported by the first terminal device; in response to the measurement data being less than the measurement threshold value corresponding to the measurement data, it is determined that the interference measurement result is that the second terminal device does not belong to the interference terminal device to be reported by the first terminal device; and in response to the interference measurement result being that the second terminal device belongs to the interference terminal device to be reported by the first terminal device, the terminal device identifier of the second terminal device and the measurement data are sent to the network device. The method determines the second terminal device that sends the UE-IM-RS according to the UE-IM-RS, and determines whether the second terminal device belongs to the interference terminal device to be reported by the first terminal device according to the measurement data of the UE-IM-RS. When the second terminal device belongs to the interference terminal device to be reported by the first terminal device, the terminal device identifier of the second terminal device and the measurement data are sent to the network device. As a result, the first terminal device is able to determine a second terminal device that has a mutual interference with it, thereby facilitating the network device to perform scheduling, avoiding concurrence of a data reception of the first terminal device and a data transmission of the second terminal device on a same-frequency, and improving the efficiency and accuracy of data transmission.

The interference measurement method in embodiments of the present disclosure is performed by the first terminal device. By receiving the inter user equipment interference management reference signal (UE-IM-RS), the second terminal device that sends the UE-IM-RS and the interference measurement result of the second terminal device may be determined, so that the first terminal device is able to determine a second terminal device that has the mutual interference with it, thereby facilitating the network device to perform scheduling, avoiding concurrence of a data reception of the first terminal device and a data transmission of the second terminal device on a same-frequency, and improving the efficiency and accuracy of the data transmission.

Figure 5:
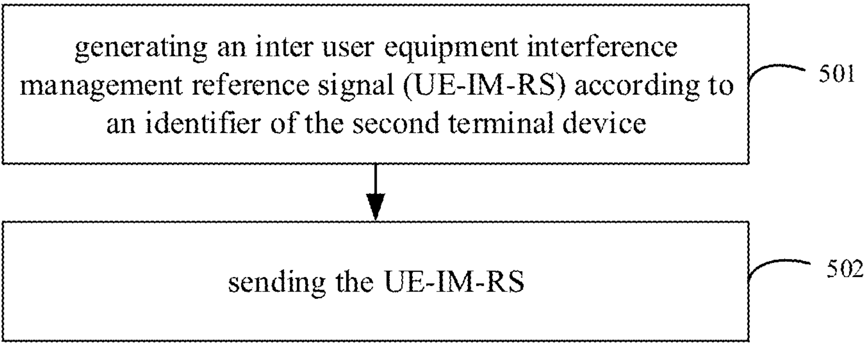
FIG. 5 is a schematic flowchart of an interference measurement method performed by a second terminal device provided by embodiments of the present disclosure.

Embodiments of the present disclosure provide an interference measurement method. FIG. 5 is a schematic flowchart of an interference measurement method provided by embodiments of the present disclosure. The interference measurement method may be performed by a second terminal device. For example, the second terminal device may be UE-A.

As shown in FIG. 5, the interference measurement method may include the following steps.

In step 501, an inter user equipment interference management reference signal (UE-IM-RS) is generated according to an identifier of the second terminal device.

In embodiments of the present disclosure, the second terminal device generates the inter user equipment interference management reference signal (UE-IM-RS) according to its own terminal device identifier.

As an example, UE-IM-RS r(m) may be generated according to a following formula:

$$r(m) = \frac{1}{\sqrt{2}}(1 - 2c(2m)) + j\frac{1}{\sqrt{2}}(1 - 2c(2m + 1));$$

where m represents an integer greater than or equal to 0, and n represents an integer greater than or equal to 0; and c(n) may be generated according to following formulas:

$$c(n) = (x_1(n + N_C) + x_2(n + N_C))\text{mod } 2;$$

$$x_1(n + 31) = (x_1(n + 3) + x_1(n))\text{mod } 2; \text{ and}$$

$$x_2(n + 31) = (x_2(n + 3) + x_2(n + 2) + x_2(n + 1) + x_2(n))\text{mod } 2;$$

where $N_C$=1600; n represents an integer greater than or equal to 0, $x_1(0)=1$, $x_1(n)=1, 2, \ldots 30$, and an initialization value of $x_2(n)$ is determined according to the identifier of the second terminal device, a wireless frame number, a subframe number and other time-related parameters.

As another example, UE-IM-RS r(n) may be generated according to following formulas:

$$r(n) = e^{j\alpha n}\bar{r}(n),\ 0 \le n \le N;$$

$$\bar{r_q}(n) = x_q(n \mod N); \text{ and}$$

$$x_q(m) = e^{-j\frac{\pi q m(m+1)}{N}};$$

where N represents a sequence length, n represents an integer greater than or equal to 0 and less than or equal to the N, and values of α and q may be determined according to the identifier of the second terminal device, a wireless frame number, a sub-frame number and other time-related parameters.

In step 502, the UE-IM-RS is sent.

Further, the second terminal device may send the generated UE-IM-RS to a first terminal device.

In summary, the inter user equipment interference management reference signal (UE-IM-RS) is generated according to the identifier of the second terminal device; and the UE-IM-RS is sent. The method enables the second terminal device to generate the UE-IM-RS according to the identifier of the second terminal device, and send the UE-IM-RS to the first terminal device. After receiving the UE-IM-RS, the first terminal device is able to determine a second terminal device that has a mutual interference with it according to the UE-IM-RS, thereby facilitating a network device to perform scheduling, avoiding concurrence of a data reception of the first terminal device and a data transmission of the second terminal device on a same-frequency, and improving the efficiency and accuracy of data transmission.

Figure 6:
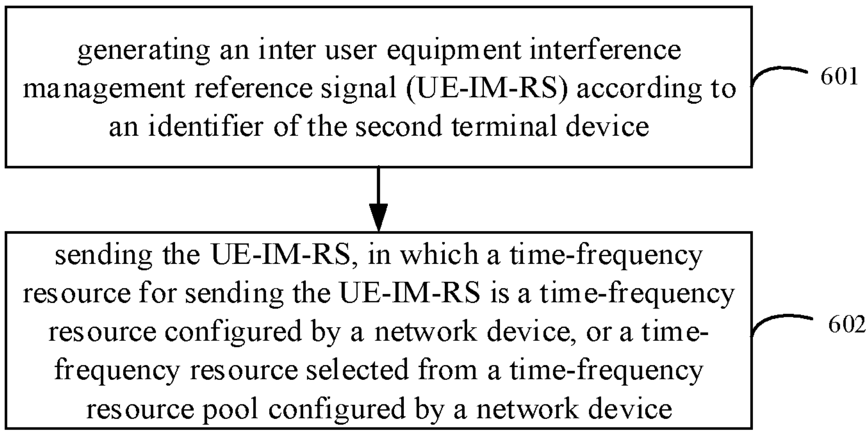
FIG. 6 is a schematic flowchart of an interference measurement method provided by embodiments of the present disclosure.

Embodiments of the present disclosure provide an interference measurement method. FIG. 6 is a schematic flowchart of an interference measurement method provided by embodiments of the present disclosure. The interference measurement method may be performed by a second terminal device.

As shown in FIG. 6, the interference measurement method may include the following steps.

In step 601, an inter user equipment interference management reference signal (UE-IM-RS) is generated according to an identifier of the second terminal device.

In step 602, the UE-IM-RS is sent. A time-frequency resource for sending the UE-IM-RS is a time-frequency resource configured by a network device, or a time-frequency resource selected from a time-frequency resource pool configured by the network device.

In embodiments of the present disclosure, the second terminal device sends the generated UE-IM-RS to a first terminal device. It should be noted that the time-frequency resource for the second terminal device to send the UE-IM-RS is a time-frequency resource configured by the network device according to a signaling, or a time-frequency resource selected from a time-frequency resource pool configured by the network device according to a signaling. In addition, it should be noted that among time-frequency resources for the first terminal device that receives the UE-IM-RS to receive signals and time-frequency resources for the second terminal device to send signals, resources with a same time and a same frequency exist.

In embodiments of the present disclosure, the step 601 may be implemented in any manner as described in various embodiments of the present disclosure, which is not limited by embodiments of the present disclosure and will not be described again.

In summary, the inter user equipment interference management reference signal (UE-IM-RS) is generated according to the identifier of the second terminal device; and the UE-IM-RS is sent. The time-frequency resource for sending the UE-IM-RS is the time-frequency resource configured by the network device, or the time-frequency resource selected from the time-frequency resource pool configured by the network device. The method enables the second terminal device to generate the UE-IM-RS according to the identifier of the second terminal device, and send the UE-IM-RS to the first terminal device. After receiving the UE-IM-RS, the first terminal device is able to determine a second terminal device that has a mutual interference with it according to the UE-IM-RS, thereby facilitating the network device to perform scheduling, avoiding concurrence of a data reception of the first terminal device and a data transmission of the second terminal device on a same-frequency, and improving the efficiency and accuracy of data transmission.

The interference measurement method according to embodiments of the present disclosure is performed by the second terminal device. According to the identifier of the second terminal device, the inter user equipment interference management reference signal (UE-IM-RS) is generated. The UE-IM-RS is sent. The method enables the second terminal device to generate the UE-IM-RS according to the identifier of the second terminal device, and send the UE-IM-RS to the first terminal device. After receiving the UE-IM-RS, the first terminal device is able to determine a second terminal device that has the mutual interference with it according to the UE-IM-RS, thereby facilitating the network device to perform scheduling, avoiding concurrence of a data reception of the first terminal device and a data transmission of the second terminal device on a same-frequency, and improving the efficiency and accuracy of the data transmission.

Figure 7:
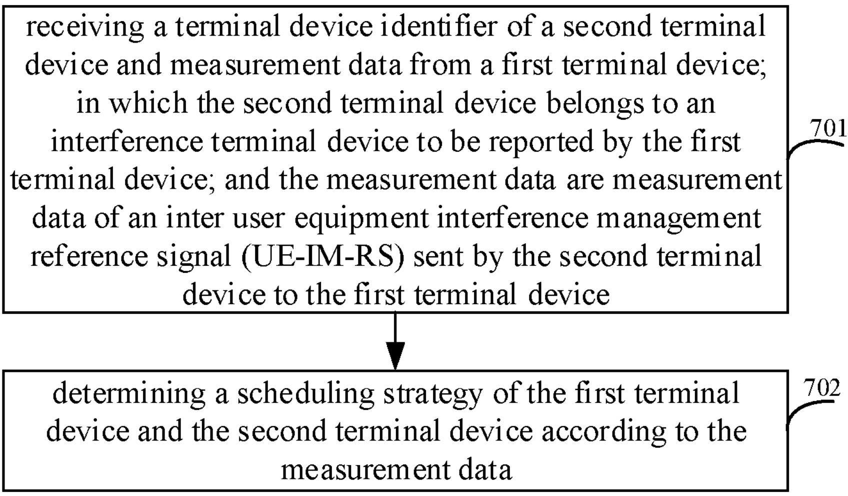
FIG. 7 is a schematic flowchart of an interference processing method performed by a network device provided by embodiments of the present disclosure.

Embodiments of the present disclosure provide an interference processing method. FIG. 7 is a schematic flowchart of an interference processing method provided by embodiments of the present disclosure. The interference processing method may be performed by a network device.

As shown in FIG. 7, the interference processing method may include the following steps.

In step 701, a terminal device identifier of a second terminal device and measurement data are received from a first terminal device. The second terminal device belongs to an interference terminal device to be reported by the first terminal device; and the measurement data are measurement data of an inter user equipment interference management reference signal (UE-IM-RS) sent by the second terminal device to the first terminal device.

In embodiments of the present disclosure, the second terminal device sends the generated UE-IM-RS to the first terminal device. After receiving the UE-IM-RS, the first terminal device may parse the UE-IM-RS to determine the terminal device identifier of the second terminal device that sends the UE-IM-RS, determine an interference measurement result of the second terminal device according to the measurement data of the UE-IM-RS, and send the terminal device identifier of the second terminal device and the measurement data to the network device when the interference measurement result of the second terminal device is that the second terminal device belongs to the interference terminal device to be reported by the first terminal device. It should be noted that the network device may pre-configure a time-frequency resource for communicating the UE-IM-RS; or configure a time-frequency resource pool for selecting a time-frequency resource for communicating the UE-IM-RS. For example, the network device may configure a time-frequency resource for the second terminal device to send the UE-IM-RS, or the network device may configure a time-frequency resource for the second terminal device to send the UE-IM-RS to be a time-frequency resource selected from the time-frequency resource pool.

In step 702, a scheduling strategy of the first terminal device and the second terminal device is determined according to the measurement data.

Further, the scheduling strategy of the first terminal device and the second terminal device may be determined according to the measurement data to avoid concurrence of a data reception of the first terminal device and a data transmission of the second terminal device on a same-frequency, thereby improving the efficiency and accuracy of data transmission.

In summary, the terminal device identifier of the second terminal device and the measurement data are received from the first terminal device. The second terminal device belongs to the interference terminal device to be reported by the first terminal device. The measurement data are the measurement data of the inter user equipment interference management reference signal (UE-IM-RS) sent by the second terminal device to the first terminal device. According to the measurement data, the scheduling strategy of the first terminal device and the second terminal device is determined. The method enables the first terminal device, after receiving the UE-IM-RS, to determine a second terminal device that has a mutual interference with it according to the UE-IM-RS, and send the terminal device identifier of the second terminal device and the measurement data to the network device when the second terminal device belongs to the interference terminal device to be reported by the first terminal device, thereby facilitating the network device to perform scheduling, avoiding concurrence of a data reception of the first terminal device and a data transmission of the second terminal device on a same-frequency, and improving the efficiency and accuracy of data transmission.

Figure 8:
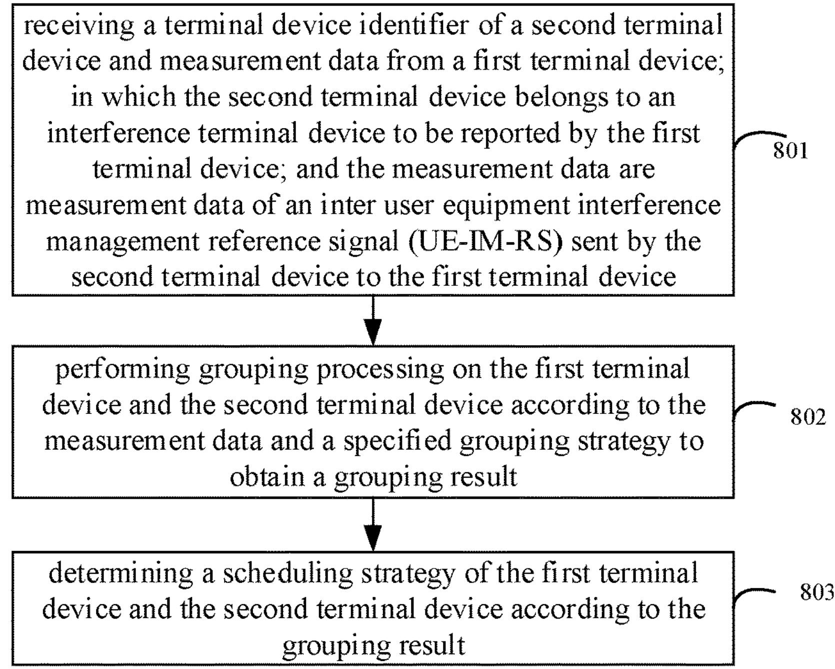
FIG. 8 is a schematic flowchart of an interference processing method provided by embodiments of the present disclosure.

Embodiments of the present disclosure provide an interference processing method. FIG. 8 is a schematic flowchart of an interference processing method provided by embodiments of the present disclosure. The interference processing method may be performed by a network device.

As shown in FIG. 8, the interference processing method may include the following steps.

In step 801, a terminal device identifier of a second terminal device and measurement data are received from a first terminal device. The second terminal device belongs to an interference terminal device to be reported by the first terminal device; and the measurement data are measurement data of an inter user equipment interference management reference signal (UE-IM-RS) sent by the second terminal device to the first terminal device.

In step 802, grouping processing is performed on the first terminal device and the second terminal device according to the measurement data and a specified grouping strategy to obtain a grouping result.

As an example, the grouping strategy is that when the measurement data are greater than or equal to a first grouping measurement threshold value corresponding to the measurement data, the first terminal device and the second terminal device are classified into a group.

That is, when the measurement data are greater than or equal to the first grouping measurement threshold value corresponding to the measurement data, the second terminal device may cause a greater interference to the first terminal device, and the first terminal device and the second terminal device may be classified into a group. It should be noted that the measurement data may include one or more of an RSRP, an RSRQ, and an SINR. Measurement data being greater than or equal to the first grouping measurement threshold value corresponding to the measurement data may be that any kind of data in the measurement data is greater than or equal to the first grouping measurement threshold value corresponding to the measurement data, or all data in the measurement data are greater than or equal to the first grouping measurement threshold value corresponding to the measurement data, or any two kinds of data in the measurement data are greater than or equal to the first grouping measurement threshold value corresponding to the measurement data, which is not specifically limited in the present disclosure.

As another example, the grouping strategy is that when the measurement data are less than a second grouping measurement threshold value corresponding to the measurement data, the first terminal device and the second terminal device are classified into a group.

That is, when the measurement data are less than the second grouping measurement threshold value corresponding to the measurement data, the second terminal device causes a less interference to the first terminal device, and the first terminal device and the second terminal device may be classified into a group. It should be noted that the measurement data may include one or more of the RSRP, the RSRQ, and the SINR. Measurement data being less than the second grouping measurement threshold value corresponding to the measurement data may be that all data in the measurement data are less than the second grouping measurement threshold value corresponding to the measurement data, or any kind of data in the measurement data is less than the second grouping measurement threshold value corresponding to the measurement data, or any two kinds of data in the measurement data are less than the second grouping measurement threshold value corresponding to the measurement data, which is not specifically limited in the present disclosure.

In step 803, a scheduling strategy of the first terminal device and the second terminal device is determined according to the grouping result.

In embodiments of the present disclosure, when the measurement data are greater than or equal to the first grouping measurement threshold value corresponding to the measurement data, indicating that the second terminal device may cause the greater interference to the first terminal device, and the first terminal device and the second terminal device are classified into a group, it may be set that a co-frequency co-time full duplex pairing is not supported between the first terminal device and the second terminal device in the group.

In addition, when the measurement data are less than the second grouping measurement threshold value corresponding to the measurement data, indicating that the second terminal device causes the less interference to the first terminal device, and the first terminal device and the second terminal device are classified into a group, it may be set that a co-frequency co-time full duplex pairing is supported between the first terminal device and the second terminal device in the group.

In summary, the terminal device identifier of the second terminal device and the measurement data are received from the first terminal device. The second terminal device belongs to the interference terminal device to be reported by the first terminal device. The measurement data are the measurement data of the inter user equipment interference management reference signal (UE-IM-RS) sent by the second terminal device to the first terminal device. According to the measurement data and the specified grouping strategy, the grouping processing is performed on the first terminal device and the second terminal device to obtain the grouping result. According to the grouping result, the scheduling strategy of the first terminal device and the second terminal device is determined. The method enables the first terminal device, after receiving the UE-IM-RS, to determine a second terminal device that has a mutual interference with it according to the UE-IM-RS, and send the terminal device identifier of the second terminal device and the measurement data to the network device when the second terminal device belongs to the interference terminal device to be reported by the first terminal device, thereby facilitating the network device to perform scheduling according to the grouping strategy and the scheduling strategy, avoiding concurrence of a data reception of the first terminal device and a data transmission of the second terminal device on a same-frequency, and improving the efficiency and accuracy of data transmission.

In the interference processing method according to embodiments of the present disclosure, the terminal device identifier of the second terminal device and the measurement data are received from the first terminal device. The second terminal device belongs to the interference terminal device to be reported by the first terminal device. The measurement data are the measurement data of the inter user equipment interference management reference signal (UE-IM-RS) sent by the second terminal device to the first terminal device. According to the measurement data, the scheduling strategy of the first terminal device and the second terminal device is determined. The method enables the first terminal device, after receiving the UE-IM-RS, to determine a second terminal device that has a mutual interference with it according to the UE-IM-RS, and send the terminal device identifier of the second terminal device and the measurement data to the network device when the second terminal device belongs to the interference terminal device to be reported by the first terminal device, thereby facilitating the network device to perform scheduling, avoiding concurrence of a data reception of the first terminal device and a data transmission of the second terminal device on a same-frequency, and improving the efficiency and accuracy of data transmission.

Corresponding to the interference measurement method provided by the above embodiments of FIG. 1 to FIG. 4, the present disclosure also provides an interference measurement apparatus. Since the interference measurement apparatus provided by embodiments of the present disclosure corresponds to the interference measurement method provided by the above embodiments of FIG. 1 to FIG. 4, the implementations of the interference measurement method are also applicable to the interference measurement apparatus provided in embodiments of the present disclosure, which will not be elaborated in embodiments of the present disclosure.

Figure 9:
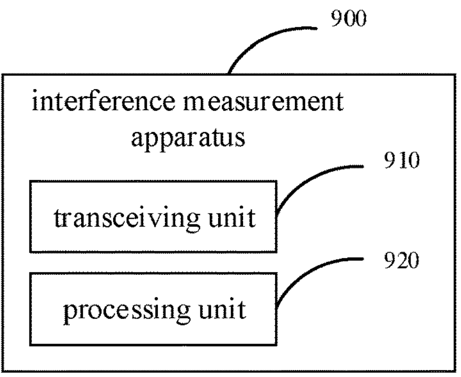
FIG. 9 is a schematic block diagram of an interference measurement apparatus applied to a first terminal device provided by embodiments of the present disclosure.

FIG. 9 is a schematic block diagram of an interference measurement apparatus provided by embodiments of the present disclosure. The apparatus is applied to a first terminal device.

As shown in FIG. 9, the interference measurement apparatus 900 includes: a transceiving unit 910 and a processing unit 920.

The transceiving unit 910 is configured to receive an inter user equipment interference management reference signal (UE-IM-RS). The processing unit 920 is configured to determine a second terminal device that sends the UE-IM-RS and determine an interference measurement result of the second terminal device according to the UE-IM-RS.

As an implementation of embodiments of the present disclosure, a time-frequency resource for receiving the UE-IM-RS is a time-frequency resource configured by a network device, or a time-frequency resource in a time-frequency resource pool configured by the network device.

As an implementation of embodiments of the present disclosure, the processing unit 920 is specifically configured to: parse the UE-IM-RS to obtain a terminal device identifier; and determine a terminal device corresponding to the terminal device identifier as the second terminal device that sends the UE-IM-RS.

As an implementation of embodiments of the present disclosure, the processing unit 920 is specifically configured to: determine measurement data of the UE-IM-RS; in response to the measurement data being greater than or equal to a measurement threshold value corresponding to the measurement data, determine that the interference measurement result is that the second terminal device belongs to an interference terminal device to be reported by the first terminal device; and in response to the measurement data being less than the measurement threshold value corresponding to the measurement data, determine that the interference measurement result is that the second terminal device does not belong to the interference terminal device to be reported by the first terminal device.

As an implementation of embodiments of the present disclosure, the transceiving unit 910 is further configured to send a terminal device identifier of the second terminal device and the measurement data to a network device in response to the interference measurement result being that the second terminal device belongs to the interference terminal device to be reported by the first terminal device.

As an implementation of embodiments of the present disclosure, the measurement data includes at least one of: a reference signal receiving power (RSRP), a reference signal receiving quality (RSRQ), or a signal to interference plus noise ratio (SINR).

As an implementation of embodiments of the present disclosure, the measurement threshold value corresponding to the measurement data is configured by a network device or determined according to a protocol.

As an implementation of embodiments of the present disclosure, among time-frequency resources for the first terminal device to receive signals and time-frequency resources for the second terminal device to send signals, resources with a same time and a same frequency exist.

The interference measurement apparatus in embodiments of the present disclosure is applied to the first terminal device. The inter user equipment interference management reference signal (UE-IM-RS) is received, the second terminal device that sends the UE-IM-RS may be determined, and the interference measurement result of the second terminal device may be determined, so that the first terminal device is able to determine a second terminal device that has a mutual interference with it, thereby facilitating the network device to perform scheduling, avoiding concurrence of a data reception of the first terminal device and a data transmission of the second terminal device on a same-frequency, and improving the efficiency and accuracy of data transmission.

Corresponding to the interference measurement method provided by the above embodiments of FIG. 5 to FIG. 6, the present disclosure also provides an interference measurement apparatus. Since the interference measurement apparatus provided by embodiments of the present disclosure corresponds to the interference measurement method provided by the above embodiments of FIG. 5 to FIG. 6, the implementations of the interference measurement method are also applicable to the interference measurement apparatus provided in embodiments of the present disclosure, and will not be elaborated in embodiments of the present disclosure.

Figure 10:
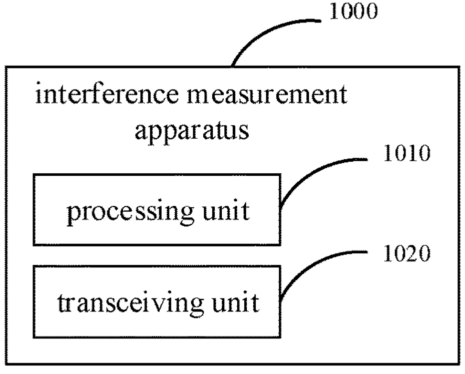
FIG. 10 is a schematic block diagram of an interference measurement apparatus applied to a second terminal device provided by embodiments of the present disclosure.

FIG. 10 is a schematic block diagram of an interference measurement apparatus provided by embodiments of the present disclosure. The apparatus is applied to a second terminal device.

As shown in FIG. 10, the interference measurement apparatus 1000 includes: a processing unit 1010 and a transceiving unit 1020.

The processing unit 1010 is configured to generate an inter user equipment interference management reference signal (UE-IM-RS) according to an identifier of the second terminal device. The transceiving unit 1020 is configured to send the UE-IM-RS.

As a possible implementation of embodiments of the present disclosure, a time-frequency resource for sending the UE-IM-RS is a time-frequency resource configured by a network device, or a time-frequency resource selected from a time-frequency resource pool configured by the network device.

As a possible implementation of embodiments of the present disclosure, among time-frequency resources for a first terminal device that receives the UE-IM-RS to receive signals and time-frequency resources for the second terminal device to send signals, resources with a same time and a same frequency exist.

The interference measurement apparatus of embodiments of the present disclosure is applied to the second terminal device. According to the identifier of the second terminal device, the inter user equipment interference management reference signal (UE-IM-RS) is generated. The UE-IM-RS is sent. The method enables the second terminal device to generate the UE-IM-RS according to the identifier of the second terminal device, and send the UE-IM-RS to the first terminal device. After receiving the UE-IM-RS, the first terminal device is able to determine a second terminal device that has the mutual interference with it according to the UE-IM-RS, thereby facilitating the network device to perform scheduling, avoiding concurrence of a data reception of the first terminal device and a data transmission of the second terminal device on a same-frequency, and improving the efficiency and accuracy of the data transmission.

Corresponding to the interference processing method provided by the above embodiments of FIG. 7 to FIG. 8, the present disclosure also provides an interference processing apparatus. Since the interference processing apparatus provided by embodiments of the present disclosure corresponds to the interference processing method provided by the above embodiments of FIG. 7 to FIG. 8, the implementations of the interference processing method are also applicable to the interference processing apparatus provided in embodiments of the present disclosure, and will not be elaborated in embodiments of the present disclosure.

Figure 11:
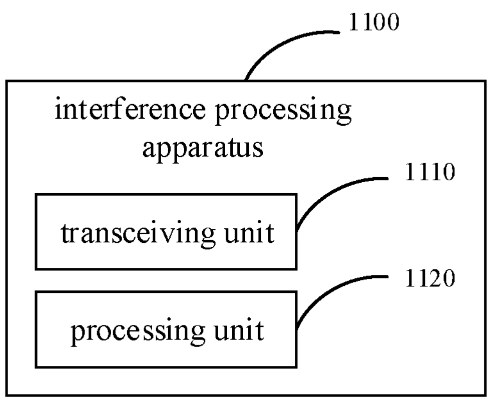
FIG. 11 is a schematic block diagram of an interference processing apparatus applied to a network device provided by embodiments of the present disclosure.

FIG. 11 is a schematic block diagram of an interference processing apparatus provided by embodiments of the present disclosure. The apparatus is applied to a network device.

As shown in FIG. 11, the interference processing apparatus 1100 includes: a transceiving unit 1110 and a processing unit 1120.

The transceiving unit 1110 is configured to receive a terminal device identifier of a second terminal device and measurement data from a first terminal device. The second terminal device belongs to an interference terminal device to be reported by the first terminal device. The measurement data are measurement data of an inter user equipment interference management reference signal (UE-IM-RS) sent by the second terminal device to the first terminal device. The processing unit 1120 is configured to determine a scheduling strategy of the first terminal device and the second terminal device according to the measurement data.

As a possible implementation of embodiments of the present disclosure, the processing unit 1120 is specifically configured to: perform grouping processing on the first terminal device and the second terminal device according to the measurement data and a specified grouping strategy to obtain a grouping result; and determine the scheduling strategy of the first terminal device and the second terminal device according to the grouping result.

As a possible implementation of embodiments of the present disclosure, the grouping strategy is that when the measurement data are greater than or equal to a first grouping measurement threshold value corresponding to the measurement data, the first terminal device and the second terminal device are classified into a group. The scheduling strategy is that a co-frequency co-time full duplex pairing is not supported between the first terminal device and the second terminal device in the group.

As a possible implementation of embodiments of the present disclosure, the grouping strategy is that when the measurement data are less than a second grouping measurement threshold value corresponding to the measurement data, the first terminal device and the second terminal device are classified into a group. The scheduling strategy is that a co-frequency co-time full duplex pairing is supported between the first terminal device and the second terminal device in the group.

As a possible implementation of embodiments of the present disclosure, the interference processing apparatus 1100 further includes: a configuring unit.

The configuring unit is configured to configure a time-frequency resource for communicating the UE-IM-RS; or configure a time-frequency resource pool for selecting a time-frequency resource for communicating the UE-IM-RS.

The interference processing apparatus according to embodiments of the present disclosure is applied to the network device. The terminal device identifier of the second terminal device and the measurement data are received from the first terminal device. The second terminal device belongs to the interference terminal device to be reported by the first terminal device. The measurement data are the measurement data of the inter user equipment interference management reference signal (UE-IM-RS) sent by the second terminal device to the first terminal device. According to the measurement data, the scheduling strategy of the first terminal device and the second terminal device is determined. The method enables the first terminal device, after receiving the UE-IM-RS, to determine a second terminal device that has a mutual interference with it according to the UE-IM-RS, and send the terminal device identifier of the second terminal device and the measurement data to the network device, thereby facilitating the network device to perform scheduling, avoiding concurrence of a data reception of the first terminal device and a data transmission of the second terminal device on a same-frequency, and improving the efficiency and accuracy of data transmission.

In order to implement the above embodiments, embodiments of the present disclosure further provide an interference measurement device, which includes: a processor; and a memory having stored therein a computer program. The processor executes the computer program stored in the memory, to cause the device to implement the method described in embodiments of FIG. 1 to FIG. 4 or the method described in embodiments of FIG. 5 to FIG. 6.

In order to implement the above embodiments, embodiments of the present disclosure further provide an interference processing device, which includes: a processor; and a memory having stored therein a computer program. The processor executes the computer program stored in the memory, to cause the device to implement the method described in embodiments of FIG. 7 to FIG. 8.

In order to implement the above embodiments, embodiments of the present disclosure further provide an interference measurement device, which includes: a processor and an interface circuit. The interface circuit is configured to receive code instructions and transmit the code instructions to the processor. The processor is configured to run the code instructions to implement the method described in embodiments of FIG. 1 to FIG. 4 or the method described in embodiments of FIG. 5 to FIG. 6.

In order to implement the above embodiments, embodiments of the present disclosure further provide an interference processing device, which includes: a processor and an interface circuit. The interface circuit is configured to receive code instructions and transmit the code instructions to the processor. The processor is configured to run the code instructions to implement the method described in embodiments of FIG. 7 to FIG. 8.

In order to implement the above embodiments, embodiments of the present disclosure further provide a computer-readable storage medium having stored therein instructions that, when executed, cause the method described in embodiments of FIG. 1 to FIG. 4 or the method described in embodiments of FIG. 5 to FIG. 6 to be implemented.

In order to implement the above embodiments, embodiments of the present disclosure further provide another computer-readable storage medium having stored therein instructions that, when executed, cause the method described in embodiments of FIG. 7 to FIG. 8 to be implemented.

In order to implement the above embodiments, embodiments of the present disclosure further provide a computer program product that, when run on a computer, causes the computer to implement the method described in embodiments of FIG. 1 to FIG. 4 or the method described in embodiments of FIG. 5 to FIG. 6.

In order to implement the above embodiments, embodiments of the present disclosure further provide a computer program product that, when run on a computer, causes the computer to implement the method described in embodiments of FIG. 7 to FIG. 8 of the present disclosure.

Figure 12:
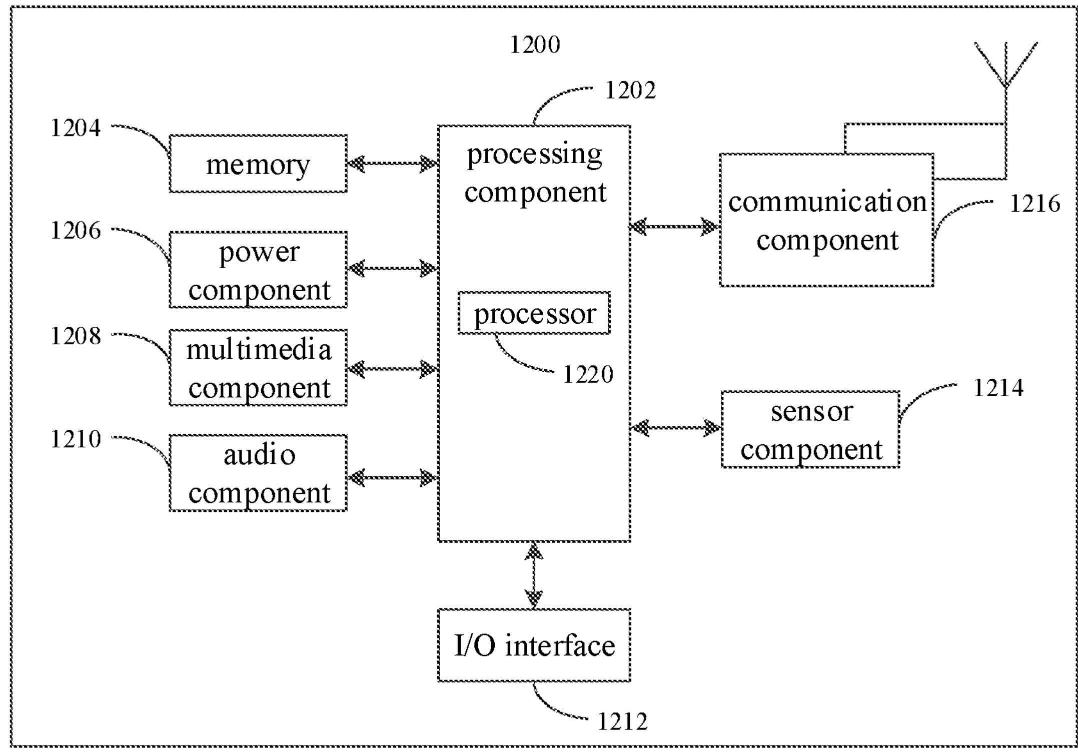
FIG. 12 is a block diagram of a UE1200 provided by embodiments of the present disclosure.

FIG. 12 is a block diagram of a UE 1200 provided by embodiments of the present disclosure. For example, the UE 1200 may be a mobile phone, a computer, a digital broadcast user equipment, a messaging device, a game console, a tablet device, a medical device, a fitness device, a personal digital assistant, or the like.

Referring to FIG. 12, the UE 1200 may include at least one of the following components: a processing component 1202, a memory 1204, a power component 1206, a multimedia component 1208, an audio component 1210, an input/output (I/O) interface 1212, a sensor component 1214, and a communication component 1216.

The processing component 1202 typically controls overall operations of the UE 1200, such as the operations associated with display, phone calls, data communications, camera operations, and recording operations. The processing component 1202 may include at least one processors 1220 to execute instructions to perform all or some of the steps in the above-described methods. Moreover, the processing component 1202 may include at least one modules which facilitate the interaction between the processing component 1202 and other components. For instance, the processing component 1202 may include a multimedia module to facilitate the interaction between the multimedia component 1208 and the processing component 1202.

The memory 1204 is configured to store various types of data to support the operation of the UE 1200. Examples of such data include instructions for any applications or methods operated on the UE 1200, contact data, phonebook data, messages, pictures, videos, etc. The memory 1204 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1206 provides power to various components of the UE 1200. The power component 1206 may include a power management system, at least one power sources, and any other components associated with the generation, management, and distribution of power in the UE 1200.

The multimedia component 1208 includes a screen providing an output interface between the UE 1200 and the user. In some embodiments, the screen may include a liquid crystal display (LCD) and a touch panel (TP). If the screen includes the touch panel, the screen may be implemented as a touch screen to receive input signals from the user. The touch panel includes at least one touch sensors to sense touches, swipes, and gestures on the touch panel. The touch sensors may not only sense a boundary of a touch or swipe action, but also sense a wake-up time and a pressure associated with the touch or swipe action. In some embodiments, the multimedia component 1208 includes a front camera and/or a rear camera. The front camera and/or the rear camera may receive an external multimedia datum while the UE 1200 is in an operation mode, such as a photographing mode or a video mode. Each of the front camera and the rear camera may be a fixed optical lens system or have focus and optical zoom capability.

The audio component 1210 is configured to output and/or input audio signals. For example, the audio component 1210 includes a microphone (MIC) configured to receive an external audio signal when the UE 1200 is in an operation mode, such as a call mode, a recording mode, and a voice recognition mode. The received audio signal may be further stored in the memory 1204 or transmitted via the communication component 1216. In some embodiments, the audio component 1210 further includes a speaker to output audio signals.

The I/O interface 1212 provides an interface between the processing component 1202 and peripheral interface modules, such as keyboards, click wheels, buttons, and the like. The buttons may include, but are not limited to, a home button, a volume button, a starting button, and a locking button.

The sensor component 1214 includes at least one sensors to provide status assessments of various aspects of the UE 1200. For instance, the sensor component 1214 may detect an open/closed status of the UE 1200, relative positioning of components, e.g., the display and the keypad, of the UE 1200. The sensor component 1214 may also detect a change in position of the UE 1200 or a component of the UE 1200, a presence or absence of user contact with the UE 1200, an orientation or an acceleration/deceleration of the UE 1200, and a change in temperature of the UE 1200. The sensor component 1214 may include a proximity sensor configured to detect the presence of nearby objects without any physical contact. The sensor component 1214 may further include a light sensor, such as a CMOS or CCD image sensor, for use in imaging applications. In some embodiments, the sensor component 1214 may further include an accelerometer sensor, a gyroscope sensor, a magnetic sensor, a pressure sensor, or a temperature sensor.

The communication component 1216 is configured to facilitate communication, wired or wireless, between the UE 1200 and other devices. The UE 1200 can access a wireless network based on a communication standard, such as WiFi, 2G, 3G, 4G LTE, 5G NR or a combination thereof. In an illustrative embodiment, the communication component 1216 receives a broadcast signal or broadcast associated information from an external broadcast management system via a broadcast channel. In an illustrative embodiment, the communication component 1216 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an illustrative embodiment, the UE 1200 may be implemented with at least one of application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic elements, for performing the method of any of the above embodiments.

In an illustrative embodiment, there is also provided a non-transitory computer readable storage medium including instructions, such as included in the memory 1204, executable by the processor 1220 in the UE 1200, for completing the above-mentioned method. For example, the non-transitory computer-readable storage medium may be an ROM, a random access memory (RAM), a CD-ROM, a magnetic tape, a floppy disc, an optical data storage device, and the like.

Figure 13:
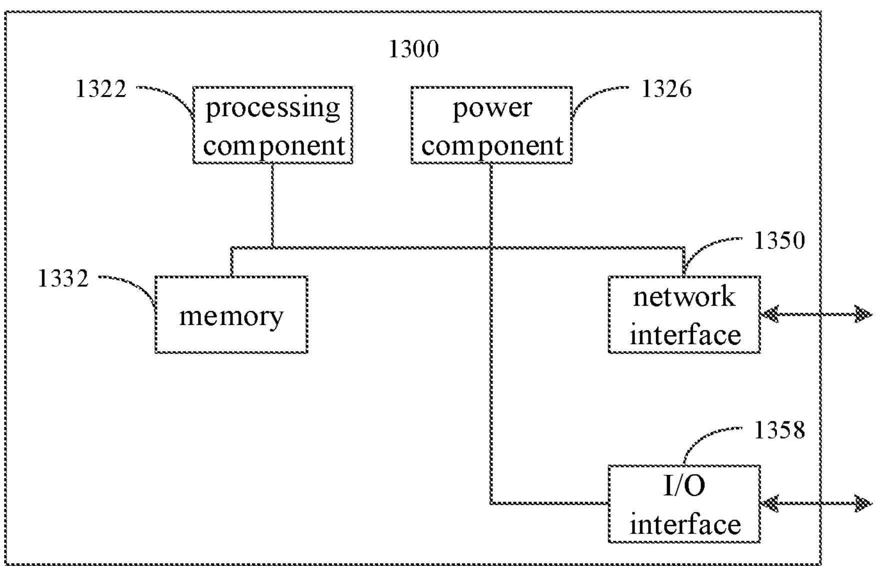
FIG. 13 is a schematic block diagram of a network device provided by embodiments of the present disclosure.

As shown in FIG. 13, which is a schematic block diagram of a network device provided by embodiments of the present disclosure. Referring to FIG. 13, the network device 1300 includes a processing component 1322, which further includes at least one of processors, and a memory resource represented by a memory 1332 configured to store instructions executable by the processing component 1322, such as application programs. The application programs stored in the memory 1332 may include one or more modules each corresponding to a set of instructions. In addition, the processing component 1322 is configured to execute instructions to perform any of the foregoing methods performed by the network device, for example, the method shown in any one of FIG. 7 to FIG. 8.

The network device 1300 may also include a power component 1326 configured to perform the power management of the network device 1300, a wired or wireless network interfaces 1350 configured to connect the network device 1300 to a network, and an input-output (I/O) interface 1358. The network device 1300 may operate based on an operating system stored in the memory 1332, such as Windows Server™, Mac OS X™, Unix™, Linux™, FreeBSD™, or the like.

Other embodiments of the present disclosure will be apparent to those skilled in the art from consideration of the specification and practice of the present disclosure disclosed here. The present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

In order to implement the above embodiments, embodiments of the present disclosure also provide a communication device. The communication device may be a network device, may also be a terminal device, may also be a chip, a chip system, or a processor that supports the network device to implement the above methods, and may also be a chip, a chip system, or a processor that supports the terminal device to implement the above methods. The device may be configured to implement the methods as described in any one of the above method embodiments, and for details, reference may be made to the descriptions in the above method embodiments.

The communications device may include one or more processors. The processor may be a general-purpose processor or a special-purpose processor. For example, it may be a baseband processor or a central processing unit. The baseband processor may be configured to process a communication protocol and communication data, and the central processing unit may be configured to control a communication device (such as a base station, a baseband chip, a terminal device, a terminal device chip, a DU or a CU, etc.), execute computer programs, and process data of the computer programs.

In some embodiments, the communication device may further include one or more memories having stored therein a computer program. The processor executes the computer program, to cause the communication device to implement the methods as described in the above method embodiments. In some embodiments, the memory may have stored therein data. The communication device and the memory may be provided separately or integrated together.

In some embodiments, the communication device may further include a transceiver and an antenna. The transceiver may be called a transceiving element, a transceiving machine, a transceiving circuit or the like, for implementing a transceiving function. The transceiver may include a receiver and a transmitter. The receiver may be called a receiving machine, a receiving circuit or the like, for implementing a receiving function. The transmitter may be called a sending machine, a sending circuit or the like, for implementing a sending function.

In some embodiments, the communication device may further include one or more interface circuits. The interface circuit is configured to receive a code instruction and transmit the code instruction to the processor. The processor runs the code instruction to enable the communication device to execute the methods as described in any one of the foregoing method embodiments.

In an implementation, the processor may include the transceiver configured to implement receiving and sending functions. For example, the transceiver may be a transceiving circuit, an interface, or an interface circuit. The transceiving circuit, the interface or the interface circuit configured to implement the receiving and sending functions may be separated or may be integrated together. The above transceiving circuit, interface or interface circuit may be configured to read or write codes/data, or the above transceiving circuit, interface or interface circuit may be configured to transmit or transfer signals.

In an implementation, the processor may have stored therein a computer program that, when run on the processor, causes the communication device to implement the methods as described in any one of the foregoing method embodiments. The computer program may be embedded in the processor, and in this case, the processor may be implemented by a hardware.

In an implementation, the communication device may include a circuit, and the circuit may implement the sending, receiving or communicating function in the foregoing method embodiments. The processor and the transceiver described in the present disclosure may be implemented on an integrated circuit (IC), an analog IC, a radio frequency integrated circuit (RFIC), a mixed-signal IC, an application specific integrated circuit (ASIC), a printed circuit board (PCB), an electronic device, etc. The processor and the transceiver may also be manufactured using various IC process technologies, such as a complementary metal oxide semiconductor (CMOS), an N-type metal-oxide-semiconductor (NMOS), a P-type metal oxide semiconductor (PMOS), a bipolar junction transistor (BJT), a bipolar CMOS (BiCMOS), silicon germanium (SiGe), gallium arsenide (GaAs), etc.

The communication device described in the above embodiments may be the network device or the terminal device, but the scope of the communication device described in the present disclosure is not limited thereto. The communication device may be a stand-alone device or may be a part of a larger device. For example, the communication device may be:

(1) a stand-alone integrated circuit (IC), or a chip, or a chip system or subsystem;

(2) a set of one or more ICs, optionally, the set of ICs may also include a storage component for storing data and computer programs;

(3) an ASIC, such as a modem;

(4) a module that may be embedded in other devices;

(5) a receiver, a terminal device, an intelligent terminal device, a cellular phone, a wireless device, a handheld machine, a mobile unit, a vehicle device, a network device, a cloud device, an artificial intelligence device, etc.;

(6) others.

For the case where the communication device may be a chip or a chip system, the chip may include a processor and an interface. In the chip, one or more processors may be provided, and more than one interface may be provided.

In some embodiments, the chip further includes a memory for storing necessary computer programs and data.

Those skilled in the art may also understand that various illustrative logical blocks and steps listed in embodiments of the present disclosure may be implemented by an electronic hardware, a computer software, or a combination thereof. Whether such functions are implemented by a hardware or a software depends on specific applications and design requirements of an overall system. For each specific application, those skilled in the art may use various methods to implement the described functions, but such an implementation should not be understood as extending beyond the protection scope of embodiments of the present disclosure.

Other embodiments of the present disclosure will be apparent to those skilled in the art from consideration of the specification and practice of the present disclosure disclosed here. The present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. An interference measurement method, performed by a first terminal device and comprising:

receiving an inter user equipment interference management reference signal (UE-IM-RS); and determining a second terminal device that sends the UE-IM-RS and determining an interference measurement result of the second terminal device according to the UE-IM-RS, wherein determining the interference measurement result of the second terminal device comprises:

determining measurement data of the UE-IM-RS;

determining that the measurement data is greater than or equal to a measurement threshold value corresponding to the measurement data, and the interference measurement result indicates that the second terminal device is an interference terminal device to be reported by the first terminal device; and determining that the measurement data is less than the measurement threshold value corresponding to the measurement data, and the interference measurement result indicates that the second terminal device is not an interference terminal device to be reported by the first terminal device.

2. The method according to claim 1, wherein a time-frequency resource for receiving the UE-IM-RS is configured by a network device, or is selected from a time-frequency resource pool configured by the network device.

3. The method according to claim 1, wherein determining the second terminal device that sends the UE-IM-RS comprises:

parsing the UE-IM-RS to obtain a terminal device identifier; and determining a terminal device corresponding to the terminal device identifier as the second terminal device that sends the UE-IM-RS.

4. An interference measurement device, comprising:

a processor; and a memory having stored therein a computer program, wherein the processor executes the computer program stored in the memory, to cause the device to implement the method according to claim 1.

5. The method according to claim 1, wherein the interference measurement result is that the second terminal device belongs to the interference terminal device to be reported by the first terminal device, wherein the method further comprises:

sending a terminal device identifier of the second terminal device and the measurement data to a network device.

6. The method according to claim 1, wherein the measurement data comprises at least one of: a reference signal receiving power (RSRP), a reference signal receiving quality (RSRQ), or a signal to interference plus noise ratio (SINR).

7. The method according to claim 1, wherein the measurement threshold value corresponding to the measurement data is configured by a network device or determined according to a protocol.

8. The method according to claim 1, wherein among time-frequency resources for the first terminal device to receive signals and time-frequency resources for the second terminal device to send signals, resources with a same time and a same frequency exist.

9. A non-transitory computer-readable storage medium having stored therein instructions that, when executed, cause the method according to claim 1.

10. An interference measurement method, performed by a second terminal device and comprising:

generating an inter user equipment interference management reference signal (UE-IM-RS) according to an identifier of the second terminal device; and sending the UE-IM-RS to indicate a first UE that receives the UE-IM-RS to execute processes of determining an interference measurement result of the second terminal device according to the UE-IM-RS, the processes comprising:

determining measurement data of the UE-IM-RS;

determining that the measurement data is greater than or equal to a measurement threshold value corresponding to the measurement data, and the interference measurement result indicates that the second UE is an interference UE to be reported by the first UE; and determining that the measurement data is less than the measurement threshold value corresponding to the measurement data, and the interference measurement result indicates that the second UE is not an the interference UE to be reported by the first UE.

11. The method according to claim 10, wherein among time-frequency resources for a first terminal device that receives the UE-IM-RS to receive signals and time-frequency resources for the second terminal device to send signals, resources with a same time and a same frequency exist.

12. The method according to claim 10, wherein a time-frequency resource for sending the UE-IM-RS is configured by a network device, or is selected from a time-frequency resource pool configured by the network device.

13. An interference measurement device, comprising:

a processor; and a memory having stored therein a computer program, wherein the processor executes the computer program stored in the memory, to cause the device to implement the method according to claim 10.

14. An interference processing method, performed by a network device and comprising:

receiving a terminal device identifier of a second terminal device and measurement data from a first terminal device; wherein the second terminal device belongs to an interference terminal device to be reported by the first terminal device; and the measurement data are measurement data of an inter user equipment interference management reference signal (UE-IM-RS) sent by the second terminal device to the first terminal device; and determining a scheduling strategy of the first terminal device and the second terminal device according to the measurement data, wherein the first terminal device determines whether the second terminal device is the interference terminal device to be reported by:

determining an interference measurement result of the second terminal device according to the UE-IM-RS, comprising:

determining that the measurement data is greater than or equal to a measurement threshold value corresponding to the measurement data, and the interference measurement result indicates that the second terminal device is the interference terminal device to be reported by the first terminal device; and determining that the measurement data is less than the measurement threshold value corresponding to the measurement data, and the interference measurement result indicates that the second terminal device is not the interference terminal device to be reported by the first terminal device.

15. An interference processing device, comprising:

a processor; and a memory having stored therein a computer program, wherein the processor executes the computer program stored in the memory, to cause the device to implement the method according to claim 14.

16. The method according to claim 14, further comprising:

configuring a time-frequency resource for communicating the UE-IM-RS; or configuring a time-frequency resource pool for selecting a time-frequency resource for communicating the UE-IM-RS.

17. The method according to claim 14, wherein determining the scheduling strategy of the first terminal device and the second terminal device according to the measurement data comprises:

performing grouping processing on the first terminal device and the second terminal device according to the measurement data and a specified grouping strategy to obtain a grouping result; and determining the scheduling strategy of the first terminal device and the second terminal device according to the grouping result.

18. The method according to claim 17, wherein the grouping strategy is that the measurement data are greater than or equal to a first grouping measurement threshold value corresponding to the measurement data, and the first terminal device and the second terminal device are classified into a group; and the scheduling strategy is that a co-frequency co-time full duplex pairing is not supported between the first terminal device and the second terminal device in the group.

19. The method according to claim 17, wherein the grouping strategy is that the measurement data are less than a second grouping measurement threshold value corresponding to the measurement data, and the first terminal device and the second terminal device are classified into a group; and the scheduling strategy is that a co-frequency co-time full duplex pairing is supported between the first terminal device and the second terminal device in the group.

* * * * *